United States Patent
Chalupa et al.

(10) Patent No.: US 8,560,649 B2
(45) Date of Patent: Oct. 15, 2013

(54) VIRTUAL APPLIANCE AUTOMATION TOOL

(75) Inventors: Andreas Chalupa, Methuen, MA (US); Zhuo Yao Chen, Chestnut Hill, MA (US)

(73) Assignee: Aspect Software, Inc., Chelmsford, MA (US)

( * ) Notice: Subject to any disclaimer, the term of this patent is extended or adjusted under 35 U.S.C. 154(b) by 113 days.

(21) Appl. No.: 12/403,749

(22) Filed: Mar. 13, 2009

(65) Prior Publication Data

US 2010/0235482 A1 Sep. 16, 2010

(51) Int. Cl.
*G06F 15/177* (2006.01)
*H04L 29/06* (2006.01)

(52) U.S. Cl.
CPC ..................................... *H04L 29/06* (2013.01)
USPC ...................................................... 709/222

(58) Field of Classification Search
USPC ............................ 709/217, 220, 222; 717/177
See application file for complete search history.

(56) References Cited

U.S. PATENT DOCUMENTS

| | | | | |
|---|---|---|---|---|
| 2008/0195659 A1* | 8/2008 | Rawle | | 707/104.1 |
| 2008/0215796 A1* | 9/2008 | Lam et al. | | 711/100 |
| 2009/0249284 A1* | 10/2009 | Antosz et al. | | 717/104 |
| 2009/0300057 A1* | 12/2009 | Friedman | | 707/102 |

* cited by examiner

*Primary Examiner* — Peter Shaw
(74) *Attorney, Agent, or Firm* — Husch Blackwell LLP

(57) ABSTRACT

A method and apparatus are provided for creating a virtual machine installer for use in a multi-tier computer system. The method includes the steps of providing a plurality of interactive applications operating together to achieve a predetermined enterprise objective, providing a plurality of substantially identical virtual appliances, modifying the plurality of virtual appliances by installing a respective interactive application into each of the plurality of virtual appliances (VAs), generating a catalog of the modified virtual appliances, and saving the modified virtual appliances and the catalog on a medium.

9 Claims, 10 Drawing Sheets

VIRTUAL APPLIANCE AUTOMATION TOOL

FIELD OF THE INVENTION

The field of the invention relates to computers and more particularly to the programming of computers.

BACKGROUND OF THE INVENTION

Computer systems have become a virtual necessity for the operation of any relatively large organization. For financial, membership or even asset information, there is no other device capable of tracking the activities of geographically diverse organizational operations administered by different people, possibly using different languages.

A computer system used by an organization will typically be provided with a number of databases to administer and track organizational activities. For example, one database may be provided for financial information (e.g., accounts receivable, accounts payable, etc.), another database may be provided to track progress towards organizational objectives (e.g., manufactured product, raw materials, etc.) and still another database may be provided to track organization membership (e.g., human resources, etc.). Consequently, organizations today require multi-tiered applications to manage the different tasks the organization needs to perform.

The most common solution for deploying a multi-tiered server-side product is to build what is typically referred to as an "application installer." The application installers are customer installer applications that install products on top of machines that are typically set up by the IT departments of the organizations. However, the use of application installers in the industry often lead to unpredictable results when using the installed products. Because all organizations have systems with different IT security, network and machine setup standards, and generally different systems than the software developer, it is common that software products developed by a company and successfully tested in-house do not properly function once they are deployed at a customer site.

An additional problem is that traditional multi-tiered application installers that run on multiple machines ask for deployment information on each and every machine on which the software is installed. Repeatedly asking for the same information is often very error-prone, and can lead to mis-configured deployments if consistent information is not entered.

One solution to these problems is to deliver applications to a customer pre-installed on a Virtual Appliance (VA). A Virtual Appliance is a virtual computer that has a multi-tiered application installed and configured on it. A virtual appliance differs from an application installer in that it is provided with its own operating system environment. A single multi-tiered application may be deployed in one or more VAs. A single physical machine may host one or more VAs. The idea behind delivering a product installed on a VA is that a customer will be running the application in an environment that is exactly the same as the environment in which the product was tested. Eliminating these environmental differences should eliminate problems that are specific to an environment in which the product was tested.

However, creating VAs is complicated, time-consuming and involves many steps. With the short timeframe companies have for development of multi-tiered applications in today's industry, there exists a need in the art for a way to automate the production of production-quality VAs.

SUMMARY

A method and apparatus are providing for creating Virtual Appliances for use in a multi-tier computer system. The method includes the steps of providing a plurality of interactive servers operating together to achieve a predetermined enterprise objective, providing a configuration file that defines an environment and interface requirements for the plurality of interactive servers; providing a plurality of substantially identical virtual appliances, modifying the plurality of virtual appliances by installing a respective interactive server functionality in the defined environment and with the defined interface requirements into each of the plurality of virtual appliances, generating a catalog of the modified virtual appliances, and saving the modified virtual appliances and the catalog on a medium.

DETAILED DESCRIPTION OF AN ILLUSTRATED EMBODIMENT

Figure 1:
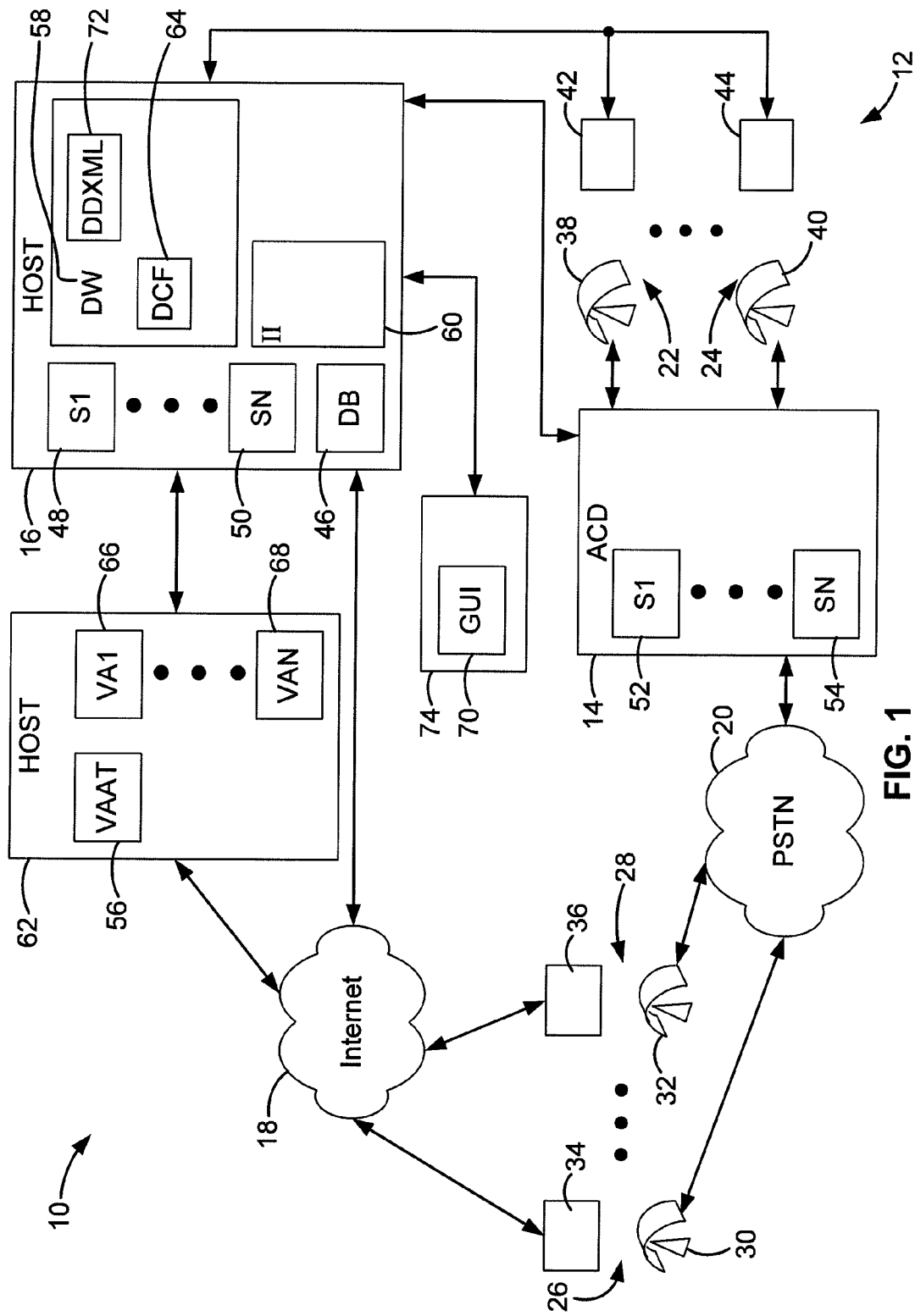
FIG. 1 depicts a computer system for collecting deployment information for a multi-tier computer system in accordance with an illustrated embodiment of the invention.

FIG. 1 is a block diagram of a software installation system 10 for automatically installing software onto a computer system shown generally in accordance with an illustrated embodiment of the invention. The software system 10 may be used in a broad range of computing applications and environments. While the system 10 may have application to many different computer system, the software loading system 10 may be of particular value in the case of a computer system with many servers such as a automatic call distribution system 12, such as that shown in FIG. 1.

System 10 provides an interface that collects information about the specific environment of deployment. This collected information will ultimately be used by a VA so that it may be properly configured for use with the target system. Processing features within the system 10 process the collected information to produce an interface profile that allows a software system with a number of servers to be properly configured and deployed with a minimum of or no user interaction.

The system 10 will be described in the context of use with an automatic call distribution system 12. While use within an automatic call distributor may simplify installation of upgrades and modifications, it should be understood that the system 10 can also be used in virtually any other multi-tier computer system. As used herein, a multi-tier computer system is a computer system with a multitude of inter-dependent servers.

In general, the automatic call distribution system 12 of FIG. 1 may be used by an organization to route calls between clients 26, 28 and agents 22, 24 of the organization. In this regard, a customer 26, 28 may place a call to the organization using a respective telephone 30, 32 of the client 26, 28. The call may be routed through the public switch telephone network (20) to an automatic call distributor (ACD) 14 of the organization.

The ACD 14 may detect the call and determine the identity of the caller and/or purpose of the call using any of a number of PSTN features (e.g., ANI, DNIS, etc.). Upon identifying the caller and/or purpose of the call, the system 12 may select an agent 22, 24 best suited to handle the call and route the call to a respective telephone 38, 40 of the selected agent 22, 24. As the call is delivered to the selected agent, a host 16 of the call distribution system 12 may use the determined identity of the client 26, 28 to deliver client records to a respective terminal 42, 44 of the selected agent 22, 24 at the same instant that the call arrives.

Alternatively, the client 26, 28 may send an e-mail to the organization using a personal computer 34, 36 of the client 26, 28. The e-mail may be routed through the Internet 18 to a host 16 of the organization. The host 16 may identify the client 26, 28 via a source URL and/or a purpose of the call from the "Re:" line of the e-mail and route the call accordingly.

In each case, the agent 22, 24 may converse with the client 26, 28 retrieve information from a database 46 and/or enter into transactions with the client 26, 28. In each case, a record of the transaction may be created and saved in the database 46.

In order to provide the functionality required, the call distribution system 12 may require a number of servers 48, 50, 52, 54. A first server (e.g., 48) may be a routing server that selects agents for handling calls. A second server (e.g., 50) may be a web hosting server. Another server (e.g., 52) may be a operational database server. Still other servers (e.g., 54) may be a reporting database server, a recording database server, or agent portal servers.

Turning now to the system 10, an explanation will be provided as to how the software system 10 may be used in its numerous embodiments. The software system 10 includes at least three components. The three components may include a Virtual Appliance Automation Tool (VAAT) 56, a deployment wizard (DW) 58 and an image installer (II) 60. These three components work together to successfully install a multi-tiered application, using a VA, onto a target system.

The VAAT 56 is the tool that builds production VAs that are preloaded with multi-tier applications, and is the primary component described herein.

In general, the software installation system 10 is provided by a software developer for use by the organization in automatically installing software within the system 12. The VAAT 56 may reside on a host 62 operated by the software developer while the deployment wizard 58 and image installer 60 may exist in the form of CDs or files transferred between the host 62 of the software developer and host 16 of the organization.

The deployment wizard 58 is an automated tool that may be used to collect information about the interrelation and environment of the servers 48, 50, 52, 54. Information about the servers 48, 50, 52, 54 is collected into a deployment configuration file 64 configured under the appropriate format (e.g., xml).

As used herein, a deployment configuration file 64 is a portable data structure that contains, inter alia, a comprehensive set of interface protocols for at least some servers of the multi-tier computer system. In this case, a set of interface protocols define who and how a server interacts with the other servers, not just for any system, but for the specific multi-tier system in which the server will operate. More specifically, the interface protocols are collected from the multi-tier system in which the servers will be installed.

Each of the sets of interface protocols is incorporated into a respective virtual appliance for the installation of the server into the multi-tier system. By incorporating the interface protocols into the respective virtual appliances, the servers can be individually installed with the respective virtual appliance, automatically, without regard to local security, network settings and machine setup standards.

The deployment configuration file 64 is accessed by the Virtual Appliance Automation Tool 56 either directly (e.g., through a CD) or through the Internet 18 in the case where the configuration file 64 resides on the organization's host server 16. The information within the deployment configuration file 64 can be used by the Virtual Appliance Automation Tool 56 to create one or more VAs 66, 68 that may have the same or similar functionality of a respective server 48, 50, 52, 54 that the VA 66, 68 will replace. Once created by the VAAT 56, the VA 66, 68, and deployment configuration file 64 if necessary, may be loaded onto a medium, such as a CD or DVD, that is transported to and placed into a media drive of the system 12. Once loaded, the VAs 66, 68 are used by the image installer 60 to automatically install and activate the VAs 66, 68 on the system 12.

Figure 2:
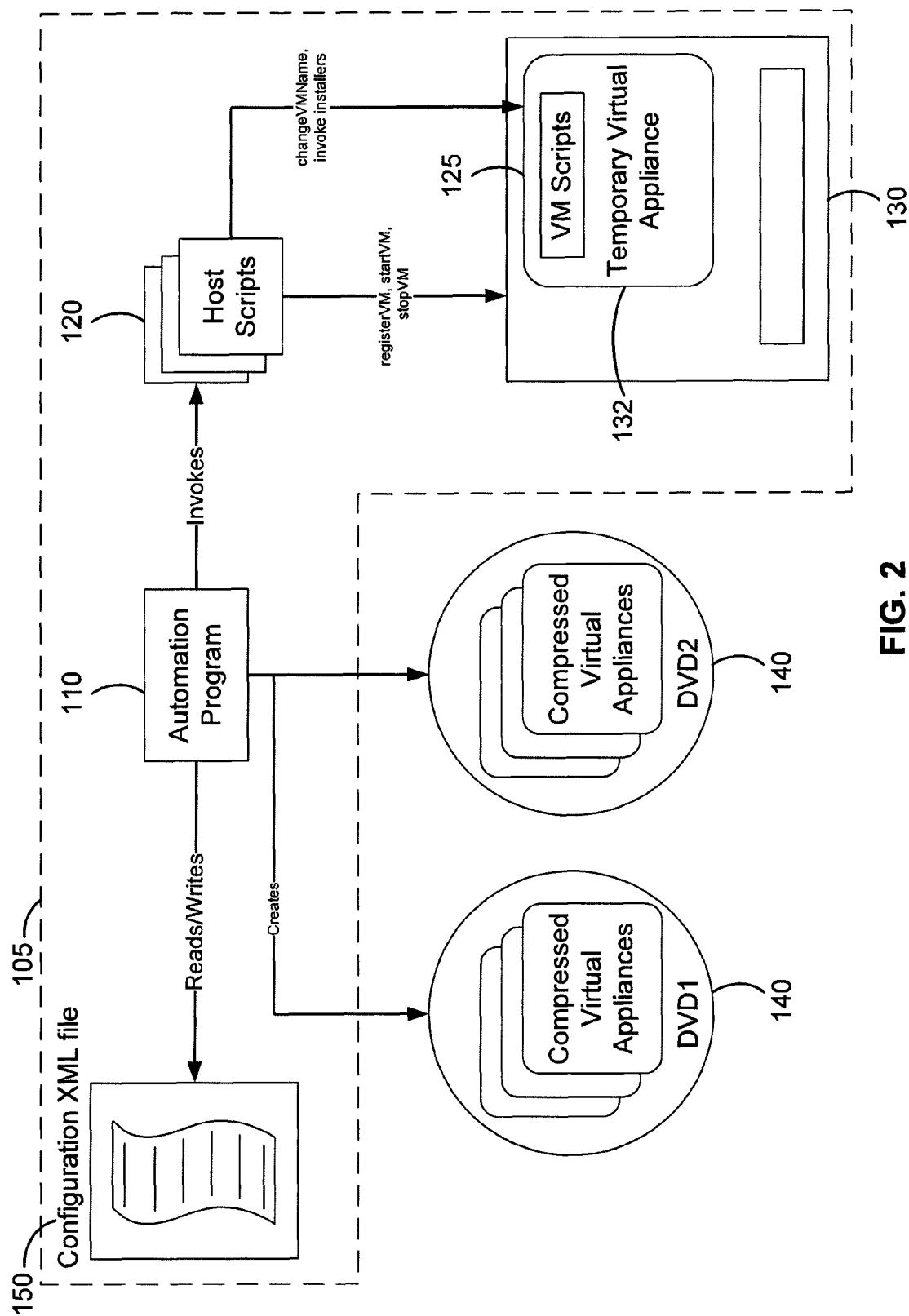
FIG. 2 depicts the basic components involved in building production VAs according to an embodiment of the invention.

FIG. 2 depicts the basic components involved in building production VAs according to an embodiment of the invention. In this embodiment, the components of the VAAT are shown as the components within dotted line 105. These components may include a production configuration file 150, an automation program 110, host scripts 120, a virtualization program 130 that comprises its own scripts 125. However, one skilled in the art would understand that a VAAT that includes or omits components different from those depicted in FIG. 2 are within the scope of the invention.

The automation program 110 is a program that coordinates the process of building VAs, according to the present embodiment. The automation program 110 uses the parameters specified in configuration file 150 and invokes the proper host scripts 120 to interact with a virtualization program 130 and create the desired VAs. Host scripts 120 are scripts that the automation program invokes to create VAs.

Temporary VAs 132 are VAs that are in the process of being built, according to the exemplary embodiment. Automation program 110 can communicate directly with the temporary VA while it is being built. Since VAs must have their own operating environment, they must be built on their own operating systems (OS's). Consequently, the temporary VA will have its own set of scripts, labeled in FIG. 2 as VA scripts 125. In an embodiment, automation program 110 uses host scripts 120 to invoke VA scripts 125, when appropriate.

Virtualization software 130 is a virtualization program. An example of a virtualization program is Microsoft's VMware, but the use of other virtualization software is within the scope of the invention. Virtualization software 130 may have its own Application Programming Interfaces (APIs) to allow the use of functions native to it. In some embodiments, the external scripts 120 may make calls to virtualization software 130's APIs to perform certain functions. For example, calls to the APIs 130 may be made to perform functions such as registering, starting, stopping and/or unregistering a temporary VA 132.

The VAAT may use a production configuration file 150 to provide information about the VAs to be created. The configuration file 150 is a file that contains information used by the automation program 110 for functions that the VAAT is to perform. In an embodiment, this file may include information such as the destination directory for built VAs, a list of VAs to build, and/or the path to a deployment configuration file 64 (see FIG. 1), if it exists. Other information may include, for example, the name of the VA to be built, the path to the base VA—the base VA being the base operating system without any other software installed on it—and/or the list of installers to be invoked on the VA. Each installer may further include, for example, information such as the local path to the install and/or the command line that to be used to invoke the installer silently. When the installer is invoked silently, it means that the installer is run and the application is installed without input from a user; in other words, the application is automatically installed on the base VA.

Once a temporary VA 132 has been fully built, the automation program 110 may also compress the built VAs 132 and then distribute the VAs 132 onto different media so that they may be shipped, if desired. FIG. 2 shows the VAs distributed on DVDs 140.

In the exemplary embodiment, the automation program 110 analyzes the size of the compressed VAs to determine how many VAs can fit on a single DVD 140. In an embodiment, the automation program 110 first combines several built VAs into a single file, then compresses that single file to a size that can be transferred to a desired media, such as a DVD, before transferring the compressed file to the desired media. If multiple DVDs are required, the automation program 110 may first distribute the built VAs into different directories, with each directory representing a single DVD 140. If desired, the automation program 110 may create an index file that describes which DVD each VA is on. This index may be used later by a different program, such as an image installer, to find the correct DVDs when installing the VAs. Although DVDs are shown as the desired media in FIG. 2, one of ordinary skill in the art would appreciate that DVDs are not the only media that may be used, and other media is within the scope and spirit of the invention.

The VAAT may be run with or without a graphical user interface (GUI). If a GUI is not used, command line arguments are used to run the VAAT. For example, a particular configuration file, such as an XML configuration file, can be specified for use to a VAAT by using a predetermined command line option. The information in the XML configuration file describes the VAs to be built, according to an embodiment. In another embodiment, an entire directory is specified by the user on the command line. The directory contains a plurality of configuration files as created by the user, optionally using a deployment wizard to create these configuration files. In this embodiment, a VAAT can create one VA for each configuration file it finds in the specified directory.

A user may also use a GUI to give instructions to a VAAT. For example, in an embodiment, a user may use the GUI may allow the user to specify: which VAs to create; to save; the configuration file to be used; a list of VAs to be created; to read a list of VAs, and/or to start the build process for the VA. The user may also use the GUI to alter a deployment configuration file to adjust the attributes of the built VA, in some embodiments. The user may be given the option to cancel an automation when being run from within a GUI, in another embodiment.

VAAT may also be programmed to provide feedback to the user during the automation process. For example, in an embodiment, the user may be sent an email by the VAAT providing information. In an embodiment, the user is provided with status and progress reports as VAs are being created. In another embodiment, the user is notified if any problems occur during creation of the VAs.

Production VA Mode

Figure 3:
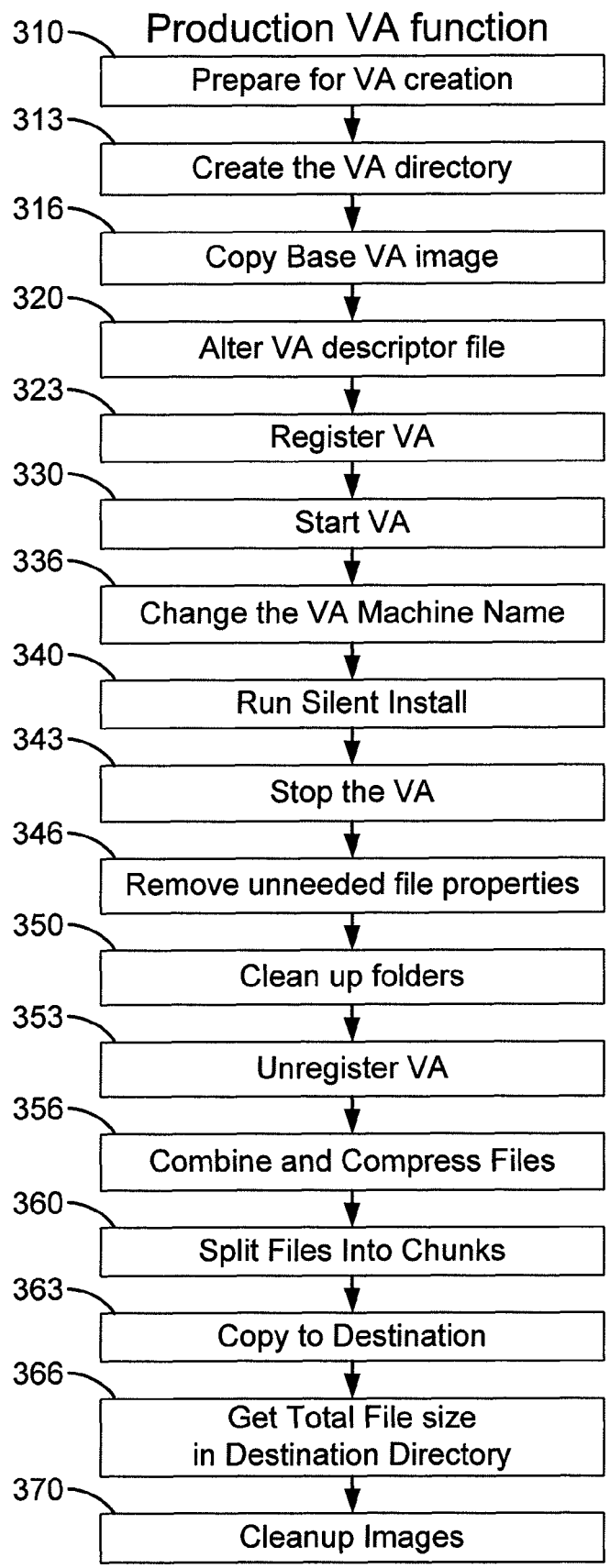
FIG. 3 is a flowchart demonstrating the process for creating VAs according to an embodiment of the invention.

The process for creating VAs can be referred to as "Production VA Mode". FIG. 3 is a flowchart demonstrating the process for creating VAs according to an embodiment of the invention.

There are multiple ways to invoke the Production VA Mode. For example, one can invoke Production VA Mode by running the VAAT without any command line arguments. In another embodiment, the Production VA Mode can be enabled by running the VAAT with a single command line argument that specifies a configuration file. In yet another embodiment, a directory is specified by the user on the command line. The directory contains a set of configuration files as created by the user, for example using a deployment wizard. In this embodiment, the VAAT can create one VA for each configuration file it finds in the said directory.

The process for creating Production VAs as shown in FIG. 3 starts at step 310, where preparation for creation of the VA is performed. Step 310 may include, for example, determining the location of key third party tools used by the VAAT, cleaning out any temporary directories, if needed, in case there are any in-process VAs from a previous run, and/or creating the output directory in which all created VAs will be placed.

The next step 313 is to create a temporary directory that will contain the VA that is being created. At step 316, the base VA is copied to the temporary directory. The base VA is, for example, a VA with no installed programs that is compatible with the desired operating system.

At step 320, the VA descriptor file, which is a text file that contains information describing the VA, is altered to contain information about the VA. Examples of information in the VA descriptor file may include, for example, the VAs name, memory size and CPU count. At step 323, the VA is registered with the virtualization software so it can be detected by the software and consequently so the build process can be started. At step 330, the VA is started in the virtualization software. At step 336, the machine name inside the VA is changed. This prevents the VA that is being built from having a generic name.

At step 340, one or more installers, as desired by the user, are run inside the VA. These installers install the desired programs onto the production VA. At step 343, the VA is stopped. Stopping the VA may require the use of the virtualization software's APIs. Any unneeded virtualization file properties are removed at step 346. At step 350, any unneeded temporary files, such as temporary log files, are removed. At step 353, the VA is unregistered with the virtualization software.

At step 356, the files comprising the built VA are combined and compressed. In an embodiment, all the VA files are combined into a single compressed file. An example of a compressed file is one in TAR format. However, other compressed files are within the scope of the invention. In the present embodiment, at step 360, the compressed file is split into chunks to allow internal processes to distribute VAs across internal networks easier. In an embodiment, the desired chunk size is 500 megabytes.

At step 363, the completed, compressed and split VA is copied to the output directory. At step 366, the size of the VA is calculated to determine which DVD folder to put the VA in. If an index file is being used, the index file is updated to reflect where the file is being placed. Finally, at step 370, the VA is copied to the output directory and any temporary copies can be deleted.

Build Test VA Mode

Figure 4:
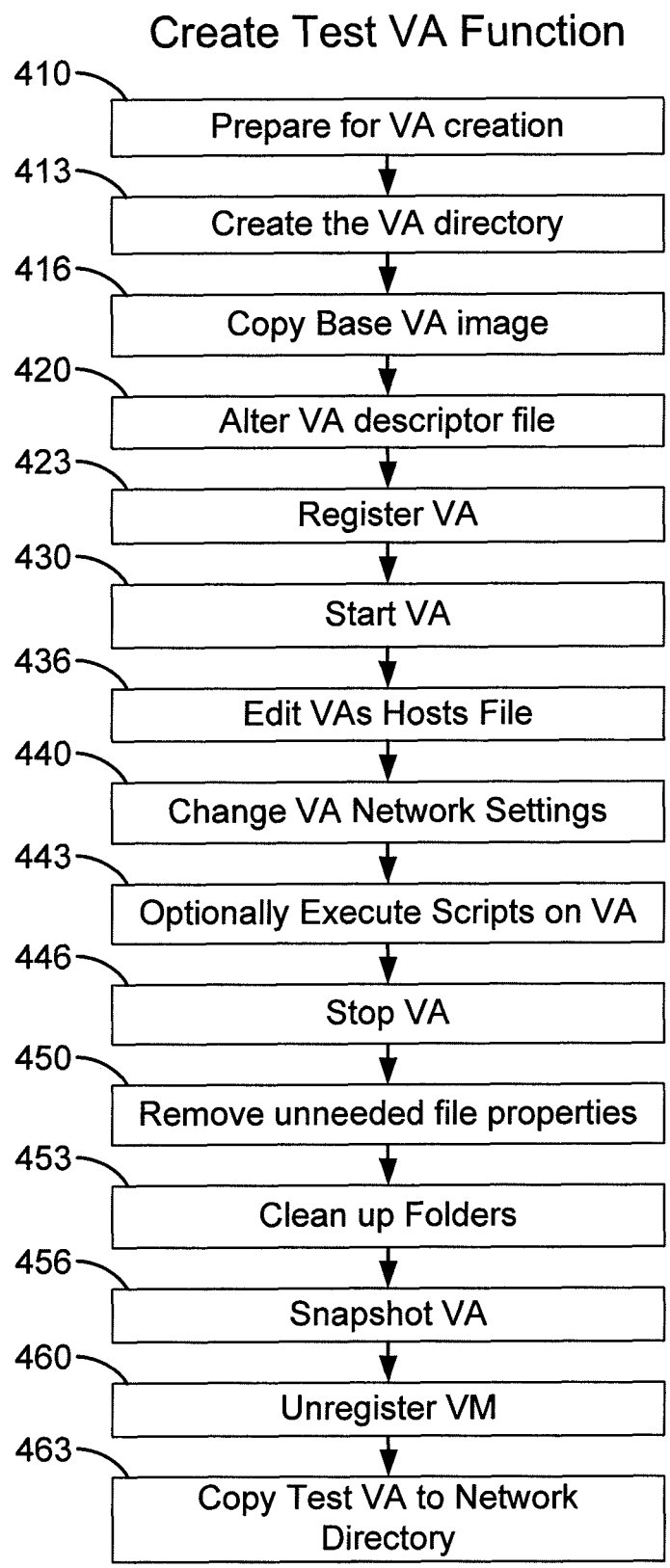
FIG. 4 is a flowchart demonstrating the process for creating test VAs according to an embodiment of the invention.

In another embodiment, a process similar to creating production VAs as illustrated in FIG. 3 can be used to create test VAs for internal testing. This process is referred to as "Build test VA mode" and is shown in FIG. 4. A test VA is a VA that has nothing more than the base operating system and any basic prerequisites that are needed to run tests. Test VAs are often not distributed to clients, but rather used internally to test production VAs to be built.

Like the production VA mode, there are multiple ways to invoke the Build Test VA Mode. In an embodiment, a user invokes Production VA Mode by running the VAAT without any command line arguments. In another embodiment, the Production VA Mode can be invoked by running the VAAT with a single command line argument that specifies a configuration.

The Build Test VA Mode is similar to the Production VA Mode. The process for creating Test VAs as shown in FIG. 4 starts at step 410, where preparation for creation of the test VA is completed. Step 410 may include, for example, determining the location of key third party tools used by the VAAT, cleaning out any temporary directories, if needed, in case there are any in-process VAs from a previous run, and creating the output directory in which all created test VAs will be placed.

The next step 413 is to create a temporary directory to hold the test VA that's being created. At step 416, the base VA is copied to the temporary directory. The base virtual machine is, for example, a clean virtual machine with the operating system. The test VA to be built may have a VA descriptor file, which is a text file that contains information describing a particular test VA. At step 420, the VA descriptor file is altered so it contains information about the test VA, for example the test VAs name, memory size and CPU count. At step 423, the test VA is registered with the virtualization software so it can be "seen" by the virtualization software and subsequently started. At step 430, the VA is started in the virtualization software. At step 436, the contents of the VAs hosts file is altered, but only if specified to do so by the user.

At step 440, the machine name and network settings inside the test VA are altered. At step 443, any folder can be optionally copied to the test VA. This step is performed if the user wishes to execute a script on the test VA.

At step 443, the user can optionally execute a script, batch file (or anything that can be run from the command line) on the test VA. At step 446, the test VA is stopped. Stopping the test VA may require the use of the virtualization software's APIs. Any unneeded virtualization file properties are removed at step 450. At step 453, any temporary files, such as temporary log files, that are unwanted are removed. At step 456, a snapshot of the newly-built test VA is created. This is useful if the user wishes to regularly load the clean image after performing some testing on the test VA.

At step 460, the test VA is unregistered with the virtualization software. At step 463, the test VA is copied to the network directory. Once the test VA is created, it is usually copied to a network drive. This is typically the drive on the host machine that will run the VA.

Testing VAs

Figure 5:
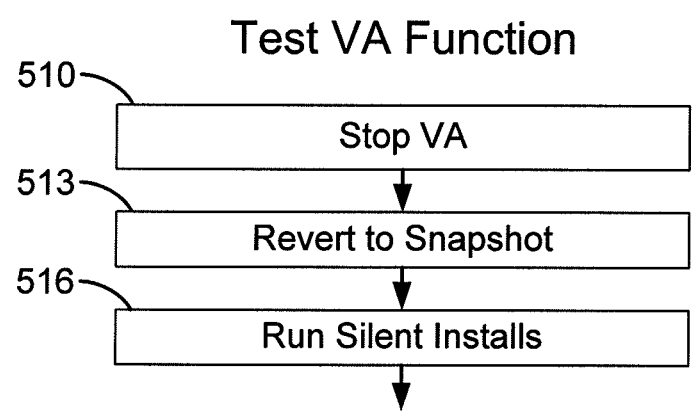
FIG. 5 is a flowchart demonstrating the process for testing VAs according to an embodiment of the invention.

In order to make testing VAATs easier, an automated process for testing installers can be also performed by the VAAT in another embodiment. This is referred to as Test VA mode. FIG. 5 is a flowchart demonstrating the process for testing VAs according to an embodiment of the invention.

There are multiple ways to invoke the Test VA Mode. For example, one can invoke Test VA Mode by running the VAAT with a specific command line argument.

The process for testing VAs is shown in FIG. 5. For each VA that is to be tested, the VA must be stopped if it is already running. This is shown at step 510. The next step is to revert to the VAs snapshot with the assumption that the snapshot contains a clean image of the machine, as shown in step 513. Once the VA is reverted, one or more silent installs can be run, as shown in step 516.

This process saves the developer time and effort associated with manually stopping the VA, reverting the VA, finding the latest built installer, and manually running through the installer GUI. When the silent install or installs complete, the developer can examine the installed VA to validate any changes or fix any bugs made to the installer.

External Interfaces

The external interface of the VAAT consists of its user interface and/or its command line options. The command line interface is run by making arguments in the command line to control which mode the tool is started in and whether it is running silently or not. Examples of specific command line arguments, according to embodiments of the invention, are using "-c" for going to Test VA Creation Mode, "-t" for Testing VA mode, or no command line option for Production VA Mode.

An embodiment of a Graphics User Interface (GUI) for the VAAT when running in production VA mode is depicted in FIGS. 6-13.

Figure 6:
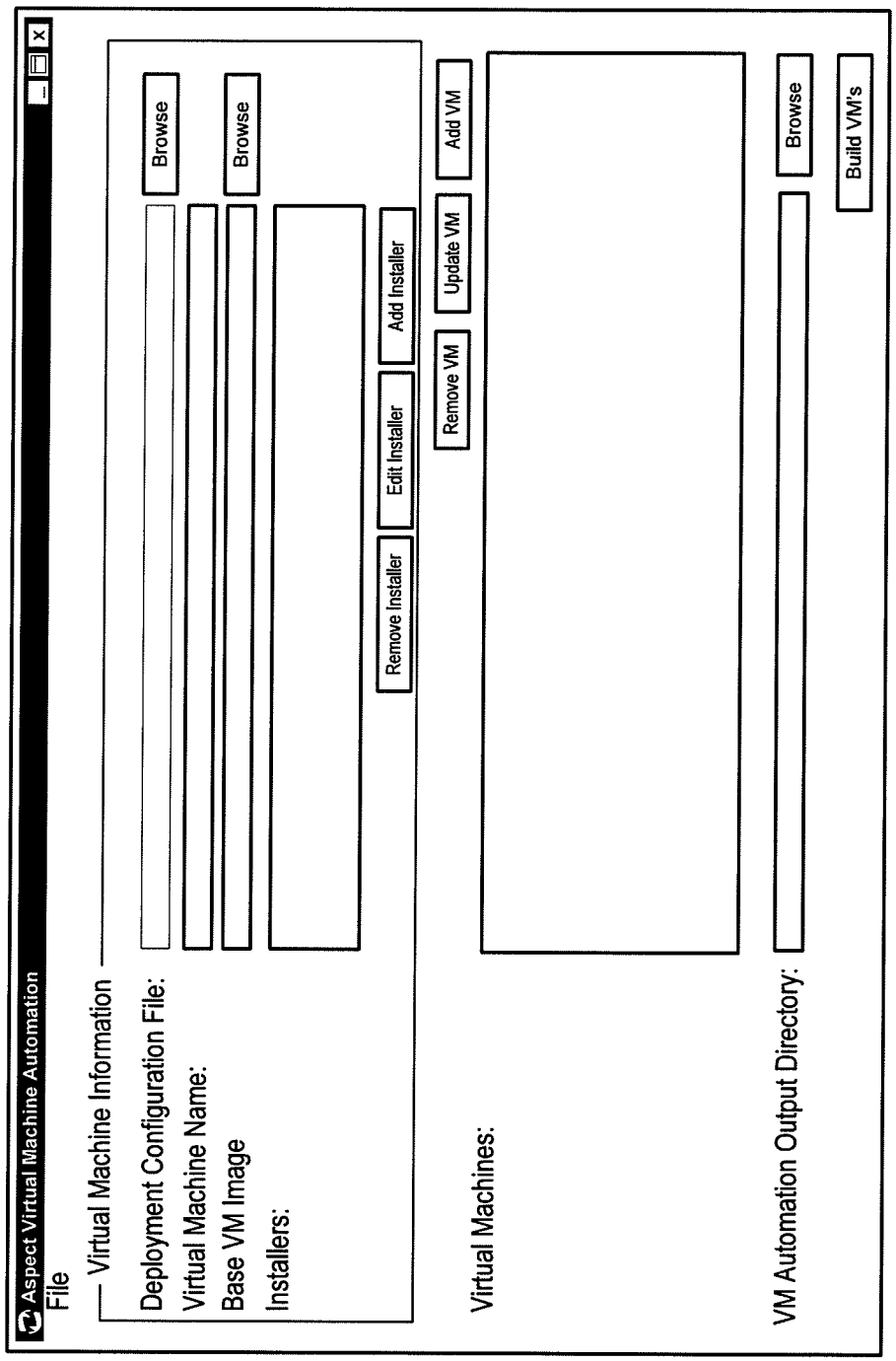
FIG. 6 depicts an interactive window for collecting VA information to describe a VA that is to be built in accordance with an embodiment of the invention.

FIG. 6 depicts an interactive window for collecting VA information to describe a VA that is to be built. The user supplies the "Virtual Machine Information" to describe a VA that is to be built. This information may include the VAs name, the path to the base image and the list of one or more installers to invoke inside the VA. Use of the Deployment Configuration File is optional. If supplied, the deployment configuration file may automatically fill out the other fields according to user-editable rules. Examples of these rules may include: filling out the VM name to be the same as the Deployment Configuration file name (without the Configuration file extension); hard coding the path to either a Windows or Linux Base VA as the Base VA; or having the VAAT fill the installer based on the image.

The bottom half of the interface shown in FIG. 6 shows the list of VAs to be built, and the output directory where all build VAs will be placed according to an embodiment. The VA Automation is started by pressing the "Build VMs" button.

Figure 7:
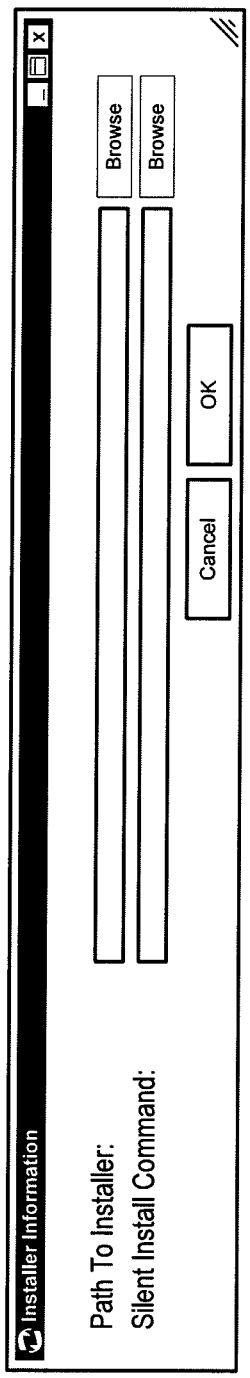
FIG. 7 depicts an interactive window for collecting installer information in accordance with an embodiment of the invention.

FIG. 7 depicts an interactive window for collecting installer information shown to the user when adding an installer, according to an embodiment. This is where the user supplies the full path to the installer to be invoked, and provides the silent install command that will be used when invoking the installer.

Figure 8:
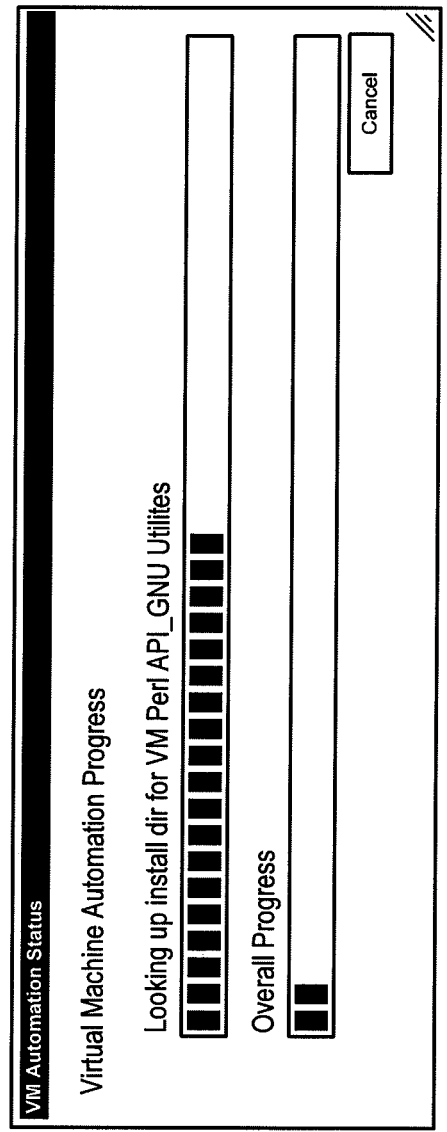
FIG. 8 depicts a window showing the status of a VA Automation process running in GUI mode.

FIG. 8 depicts a window showing the status of any VA Automation process running in GUI mode, according to an embodiment. The top progress bar shows the currently executing task and its progress, and the bottom progress bar shows the overall progress of the entire VA Automation.

In an embodiment, the "Cancel" button can be activated at any time to cancel the current automation. Sometimes, however, the cancellation may not always happen immediately. The VA Automation tool may cancel the operation as soon as the currently executing step is completed, and will not proceed to the next step in the process. Consequently, since some steps take several minutes to run, a cancellation attempt may also take several minutes to complete.

Figure 9:
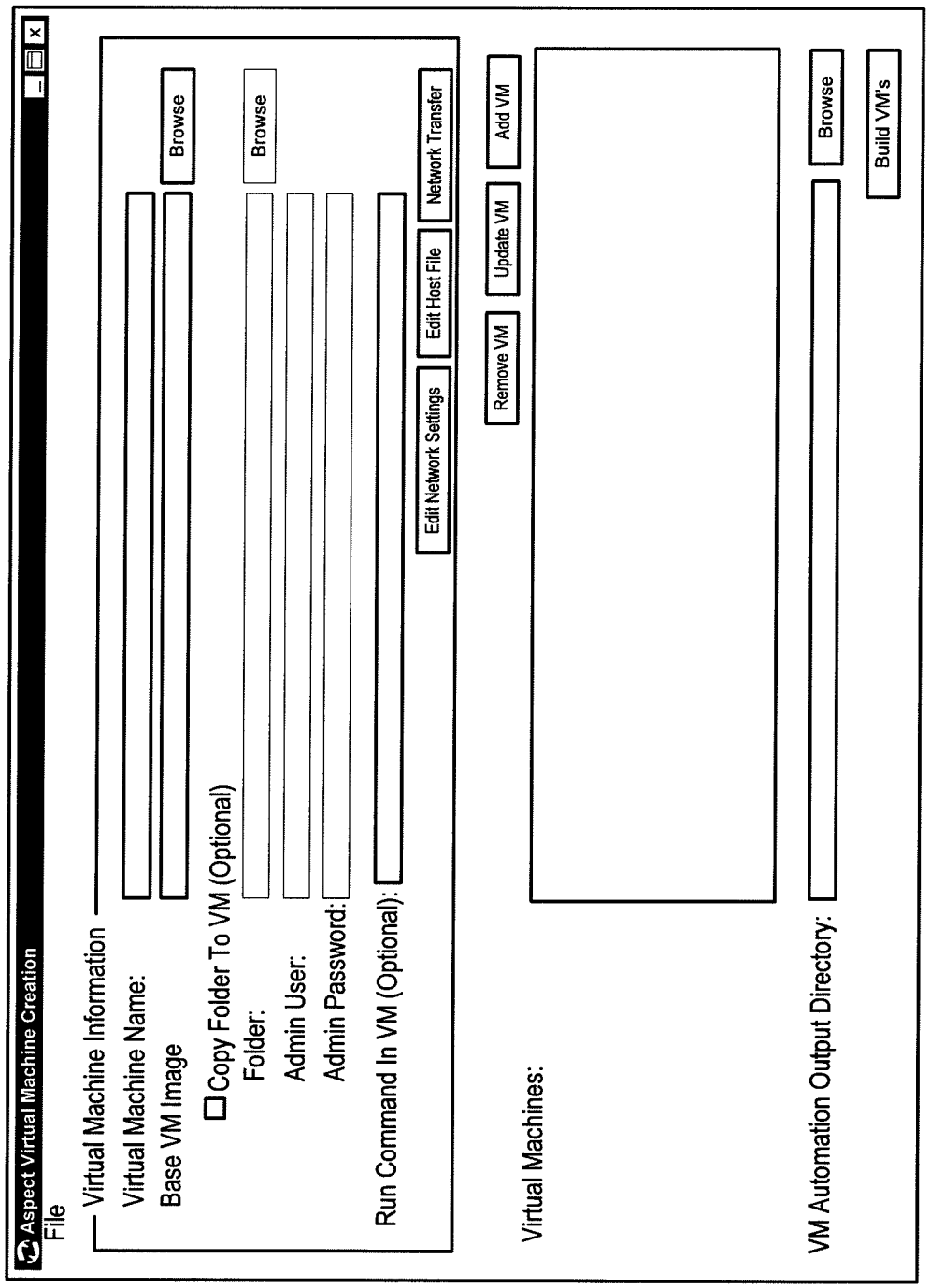
FIG. 9 depicts an interactive window for collecting VA information when running in Build Test VA Mode in accordance with an embodiment of the invention.

FIG. 9 depicts an interactive window for collecting VA information when running in Build Test VA Mode accordance with an embodiment of the invention. The bottom half of this user interface contains the list of VAs to create, the directory to put the built VAs in and the "Build VMs" button. All of these controls act the same as described as in FIG. 6.

To build test VAs, the user may need to supply additional information, including the VA machine name, the path to the base VA image, and other information. For example, the user may need to specify whether to copy a folder to the VM or not, and, if so, the folder to copy, the Administrator user name that is configured inside the VA, and/or the Administrator password that is configured inside the VA.

Other information may need to be specified, such as whether to run an optional command inside the VA, the network settings, the Hosts File entries, and/or whether to transfer the built VA to a network location.

When all VAs that are to be built are specified, the "Build VMs" button should be selected to start the process. The Status dialog box that was shown in FIG. 7 is also used when creating test VAs.

Figure 10:
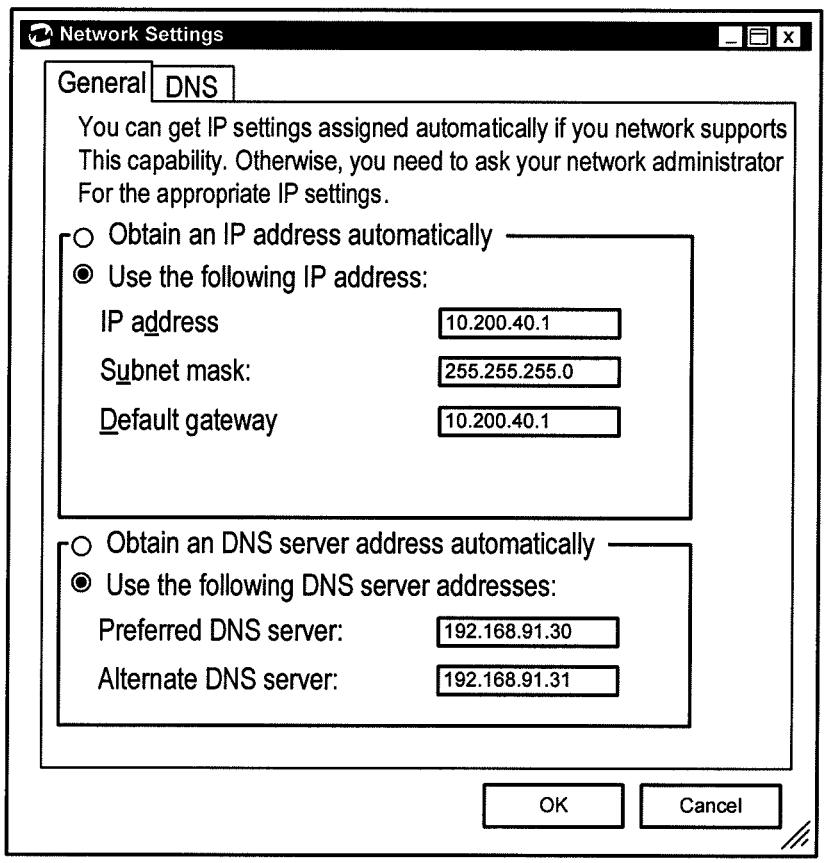
FIG. 10 depicts an interactive window for collecting network settings information when running in Build Test VA Mode in accordance with an embodiment of the invention.

FIG. 10 depicts an interactive window for collecting network settings information when running in Build Test VA Mode accordance with an embodiment of the invention.

Figure 11:
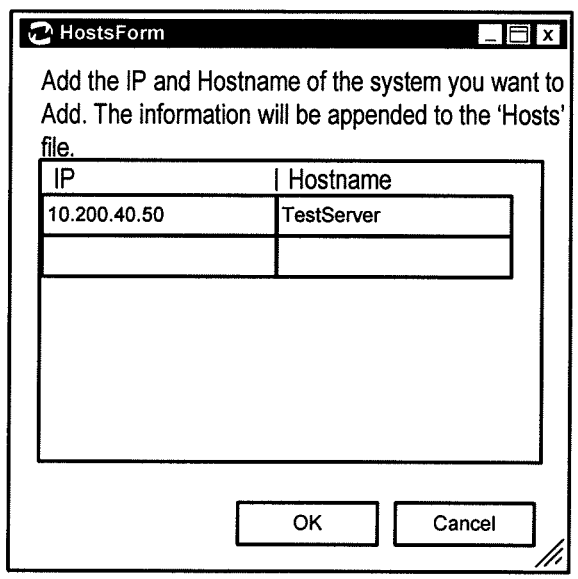
FIG. 11 depicts an interactive window for collecting hosts file information when running in Build Test VA Mode in accordance with an embodiment of the invention.

FIG. 11 depicts an interactive window for collecting hosts file information when running in Build Test VA Mode accordance with an embodiment of the invention. The Edit Hosts File dialog allows the user to specify entries to be added to the hosts file. In an embodiment, each entry consists of a host name and a corresponding IP address.

Figure 12:
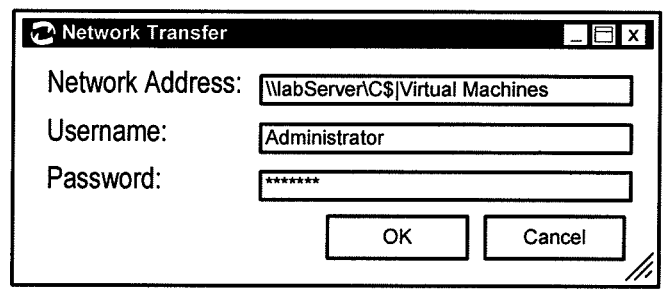
FIG. 12 depicts an interactive window for collecting network path information when copying a test VA in Build Test VA Mode in accordance with an embodiment of the invention.

FIG. 12 depicts an interactive window for collecting network path information when copying a test VA when running in Build Test VA Mode in accordance with an embodiment of the invention. This dialog is used to specify the network path and credentials if a user wishes to copy the created test VA to another machine, which is typically the host machine that will run the Test VA.

Figure 13:
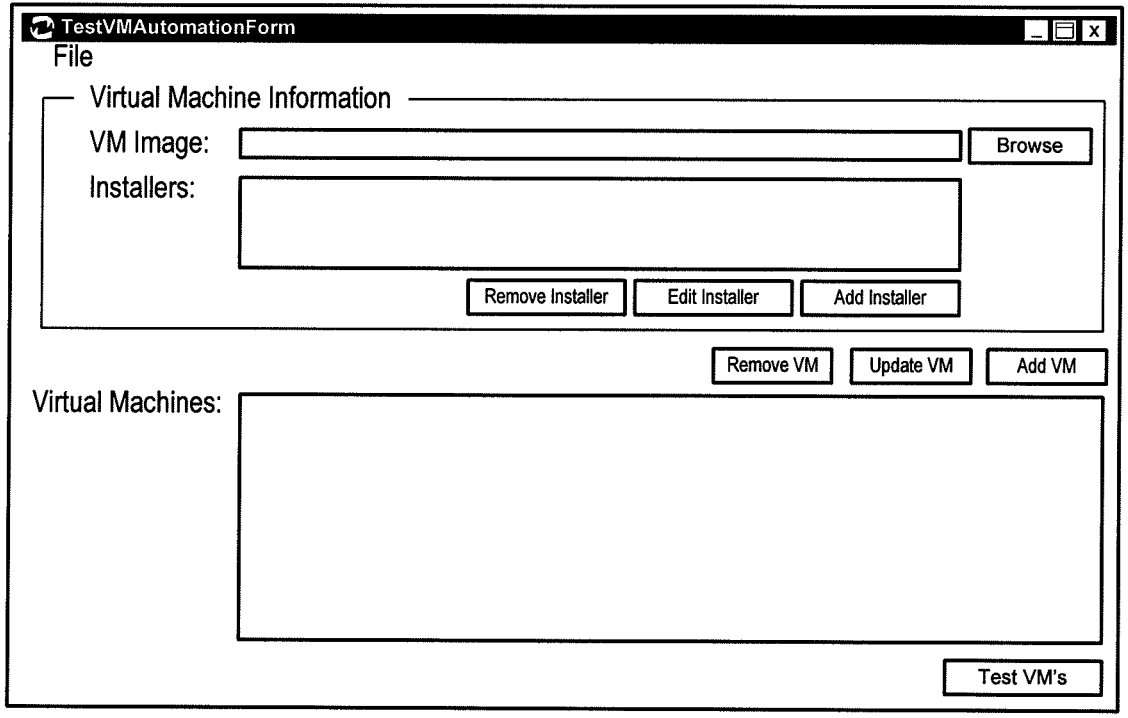
FIG. 13 depicts an interactive window for collecting information when running in Test VA Mode according to an embodiment of the invention.

FIG. 13 depicts an interactive window for collecting information when running in Test VA Mode according to an embodiment of the invention. In this mode, the user must specify the path to the test VA. For each test VA the user needs to specify the installer or installers to silently run inside the VM.

The bottom half of FIG. 13 lists the VAs that are to be tested and the "Test VMs" button should be activated when the user is ready to begin a test. The "Status" and "Installers" dialogs shown above are both reused in this mode.

A specific embodiment of a virtual machine installer according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of configuring a computer system comprising:
providing a plurality of interactive servers designed to operate together to achieve a predetermined enterprise objective;
defining the predetermined enterprise objective as automatic call distribution within an automatic call distributor;
collecting a respective set of interface protocols for each of the plurality of interactive servers from the computer system, each set of interactive protocols defining how each respective interactive server interacts with the other of the plurality of interactive servers;
providing a deployment configuration file for each respective server of the plurality of interactive servers that defines an environment and interface requirements for each respective server of the plurality of interactive servers and which includes the respective sets of interface protocols;
providing a plurality of substantially identical virtual appliances for installation of the respective interactive servers and each respective virtual appliance incorporating the respective set of interface protocols;
modifying and installing the plurality of virtual appliances by installing functionality of the respective interactive server of the plurality of interactive servers in the defined environment and with the defined interface requirements into each of the plurality of virtual appliances using the respective deployment configuration file;
generating a catalog of the modified virtual appliances; and
saving the modified virtual appliances and the catalog on a medium.

2. The method of configuring the computer as in claim 1 further comprising naming each of the plurality of modified virtual appliances with a respective name of a respective one of the plurality of interactive servers.

3. The method as in claim 1 wherein the step of saving further comprises zipping and compressing the modified virtual appliances and catalog into a DVD.

4. The method as in claim 1 further comprising defining a server of the plurality of servers as being a call routing server.

5. The method as in claim 1 further comprising defining a server of the plurality of servers as being a web hosting server.

6. The method as in claim 1 further comprising defining a server of the plurality of servers is being a call reporting server.

7. An apparatus for configuring a computer system configuring comprising:
means for operating a plurality of interactive servers together to achieve a predetermined enterprise objective;
means for defining the predetermined enterprise objective as automatic contact distribution within an automatic call distributor;
means for collecting a respective set of interface protocols for each of the plurality of interactive servers from the computer system, each set of interactive protocols defining how each respective interactive server interacts with the other of the plurality of interactive servers;
means for providing a deployment configuration file for each respective server of the plurality of interactive servers that defines an environment and interface requirements for each respective server of the plurality of interactive servers and which includes the respective sets of interface protocols;

means for providing a plurality of substantially identical virtual appliances for installation of the respective interactive servers and each respective virtual appliance incorporating the respective set of interface protocols;

means for modifying and installing the plurality of virtual appliances by installing functionality of the respective interactive server of the plurality of interactive servers in the defined environment and with the defined interface requirements into each of the plurality of virtual appliances using the respective deployment configuration file;

means for generating a catalog of the modified virtual appliances; and means for saving the modified virtual appliances and the catalog on a medium.

8. An apparatus for configuring a computer system comprising:

a plurality of interactive servers to operate together to achieve a predetermined enterprise objective, wherein the predetermined objective is defined as automatic contact distribution within an automatic call distributor;

a deployment configuration file for each respective server of the plurality of interactive servers, wherein the deployment configuration file defines an environment and interface requirements for each respective server of the plurality of interactive servers and includes respective sets of interface protocols for each of the plurality of interactive servers collected from the computer system, each set of interactive protocols defining how each respective interactive server interacts with the other of the plurality of interactive servers;

a plurality of substantially identical virtual appliances for installation of the respective interactive servers and each respective virtual appliance incorporating the respective set of interface protocols, wherein the plurality of virtual appliances are modified and installed using the respective deployment configuration file by installing functionality of the respective interactive server of the plurality of interactive servers in the defined environment and with the defined interface requirements into each of the plurality of virtual appliances; and a catalog of the modified virtual appliances, wherein the modified virtual appliances and catalog are stored on a medium.

9. The apparatus of claim 8 further comprising a writable medium, wherein the modified virtual appliances and the catalog are saved on the medium.

* * * * *